United States Patent
Hosseini et al.

(10) Patent No.: US 11,627,585 B2
(45) Date of Patent: Apr. 11, 2023

(54) PREEMPTION INDICATION AND POWER CONTROL FOR SIDELINK

(71) Applicant: QUALCOMM INCORPORATED, San Diego, CA (US)

(72) Inventors: Seyedkianoush Hosseini, San Diego, CA (US); Gokul Sridharan, Sunnyvale, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 16/947,864

(22) Filed: Aug. 20, 2020

(65) Prior Publication Data
US 2021/0058938 A1 Feb. 25, 2021

Related U.S. Application Data

(60) Provisional application No. 62/889,443, filed on Aug. 20, 2019.

(51) Int. Cl.
*H04W 72/10* (2009.01)
*H04W 52/10* (2009.01)
*H04W 72/04* (2023.01)

(52) U.S. Cl.
CPC ........... *H04W 72/10* (2013.01); *H04W 52/10* (2013.01); *H04W 72/042* (2013.01)

(58) Field of Classification Search
None
See application file for complete search history.

(56) References Cited

U.S. PATENT DOCUMENTS 10,813,137 B2 * 10/2020 Shih .................... H04W 72/042
2020/0029340 A1 * 1/2020 He ....................... H04B 7/2615
(Continued)

FOREIGN PATENT DOCUMENTS

WO 2016022849 A1 2/2016
WO WO-2019160788 A1 * 8/2019 ............ H04W 72/10

OTHER PUBLICATIONS

Fujitsu: "Resource Allocation for NR V2X Sidelink Communication", Mobile Competence Centre, 650, Route Des Lucioles, F-06921 Sophia-Antipolis, vol. RAN WG2, No. Spokane, United States, Nov. 12, 2018-Nov. 16, 2018, Nov. 2, 2018 (Nov. 2, 2018), XP051478610, 9 Pages, Retrieved from the Internet: URL: http://www.3gpp.org/ftp/tsg%5Fran/WG1%5FRL1/TSGR1%5F95/Docs/R1%2D1812410%2Ezip. [retrieved on Nov. 2, 2018] Proposal 7.

(Continued)

*Primary Examiner* — Kodzovi Acolatse
(74) *Attorney, Agent, or Firm* — Danai Nelisile Mhembere; Haynes and Boone, LLP

(57) ABSTRACT

Wireless communications systems and methods related to reallocating resources assigned to sidelinks are provided. A first user equipment receives a preemption indication from a base station. The preemption indication is for reallocating resources allocated for communication between the first user equipment and the base station and for sidelink communication between the first user equipment and a second user equipment. Based on the preemption indication, the first user equipment reallocates the resources for the communication between the first user equipment and the base station. Based on the preemption indication, the first user equipment reallocates the resources for the sidelink communication between the first user equipment and the second user equipment.

30 Claims, 8 Drawing Sheets

(56) References Cited

U.S. PATENT DOCUMENTS

| | | | | |
|---|---|---|---|---|
| 2020/0336249 A1* | 10/2020 | Yi | ............ | H04L 5/003 |
| 2020/0404560 A1* | 12/2020 | Zhang | ............ | H04W 72/02 |
| 2021/0022056 A1* | 1/2021 | Lee | ............ | H04W 16/14 |
| 2021/0211239 A1* | 7/2021 | Fan | ............ | H04L 49/3072 |
| 2021/0227508 A1* | 7/2021 | Lee | ............ | H04W 72/042 |
| 2021/0307032 A1* | 9/2021 | Osawa | ............ | H04W 72/1263 |
| 2022/0167362 A1* | 5/2022 | Liu | ............ | H04W 74/08 |

OTHER PUBLICATIONS

Intel Corporation: "On Enhancements of NR/LTE Uu Interfaces for Sidelink Resource Allocation", 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051554438, 8 Pages, Retrieved from the Internet: URL: http://www.3gpp.org/ftp/Meetings%5F3GPP%5FSYNC/RAN1/Docs/R1%2D1812494%2Ezip. [Retrieved on Nov. 11, 2018] p. 5, paragraph 4.3.-p. 6, paragraph 4.3.

International Search Report and Written Opinion—PCT/US2020/047273—ISA/EPO—dated Nov. 13, 2020.

Qualcomm Incorporated: "Sidelink Resource Allocation Mechanism for NR V2X", Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020 (Apr. 11, 2020), XP051875653, 22 Pages, Retrieved from the Internet: URL: https://ftp.3gpp.org/tsg_ran/WG1_RL1/TSGR1_100b_e/Docs/R1-2002539.zip - R1-2002539 Mode2 Resource Allocation.docx [Retrieved on Apr. 11, 2020] p. 5, paragraph 4-p. 6, paragraph 4 figure 2.

* cited by examiner

PREEMPTION INDICATION AND POWER CONTROL FOR SIDELINK

CROSS REFERENCE TO RELATED APPLICATIONS

The present application claims priority to and the benefit of the U.S. Provisional Patent Application No. 62/889,443, filed Aug. 20, 2019, which is hereby incorporated by reference in its entirety as if fully set forth below and for all applicable purposes.

TECHNICAL FIELD

The technology discussed in this disclosure relates generally to wireless communication systems, and more particularly to preempting resources and controlling power for sidelink communication between user equipment.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple wireless communication devices, which may be otherwise known as user equipment (UE).

The base stations in the wireless communication systems may allocate and reallocate resources for uplink and downlink communication to various UEs. Additionally, to support peer-to-peer or sidelink communication between UEs, the base stations may also allocate resources for uplink and downlink communication between UEs. The embodiments below describe various techniques for reallocating resources that have been previously allocated to UEs for peer-to-peer communications. The embodiments below also describer various techniques for maintaining accuracy by reducing interference between UEs.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A base station may allocate resources for uplink and downlink communications between the base station and a first UE and for sidelink communications between the first UE and a second UE over a sidelink. The base station may reallocate the resources from the first UE to a third UE. The base station may also employ techniques that reallocate the resources from the sidelink between the first UE and the second UE.

As an alternative to reallocating the resources from the sidelink between the first UE and the second UE, the base station may also transmit the power boost information that may boost power for transmissions made by the first UE, second UE and third UE to reduce interference. Alternatively, the first UE may transmit the power boost information to the second UE over sidelink.

For example, in an aspect of the disclosure, a method of wireless communication, may include receiving, by a first wireless communication device from a second wireless communication device, a preemption indication for reallocating a resource allocated for sidelink communication between the first wireless communication device and a third wireless communication device. The method may further include determining a priority of the resource and preventing use of the resource for the sidelink communication based on the priority and the preemption indication.

In an additional aspect of the disclosure, a method of wireless communication, may include receiving, by a first wireless communication device from a second wireless communication device, a preemption indication for reallocating a resource allocated for communication between the first wireless communication device and the second wireless communication device and for sidelink communication between the first wireless communication device and a third wireless communication device. The method may further include preventing, based on the preemption indication, use of the resource for the communication between the first wireless communication device and the second wireless communication device. The method may further include maintaining, based on the preemption indication, use of the resource for the sidelink communication between the first wireless communication device and third wireless communication device.

In an additional aspect of the disclosure, a user equipment may include a transceiver configured to receive, from a wireless communication device, a preemption indication for reallocating a resource allocated for sidelink communication between the user equipment and an additional user equipment. The user equipment may further include a processor configured to determine a priority of the resource and to prevent use of the resource for the sidelink communication based on the priority and the preemption indication.

In an additional aspect of the disclosure, a user equipment may include a transceiver configured to receive, from a wireless communication device, a preemption indication for reallocating a resource allocated for communication between the user equipment and the wireless communication device and for sidelink communication between the user equipment and an additional user equipment. The user equipment may further include a processor configured to prevent, based on the preemption indication, use of the resource for the communication between the user equipment and the wireless communication device. The processor may be further configured to maintain, based on the preemption indication, use of the resource for the sidelink communication between the user equipment and the additional user equipment.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, such exemplary embodiments can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The disclosure describes techniques for reallocating resources by using a preemption indication and for controlling power for sidelink communication between UEs.

Figure 1:
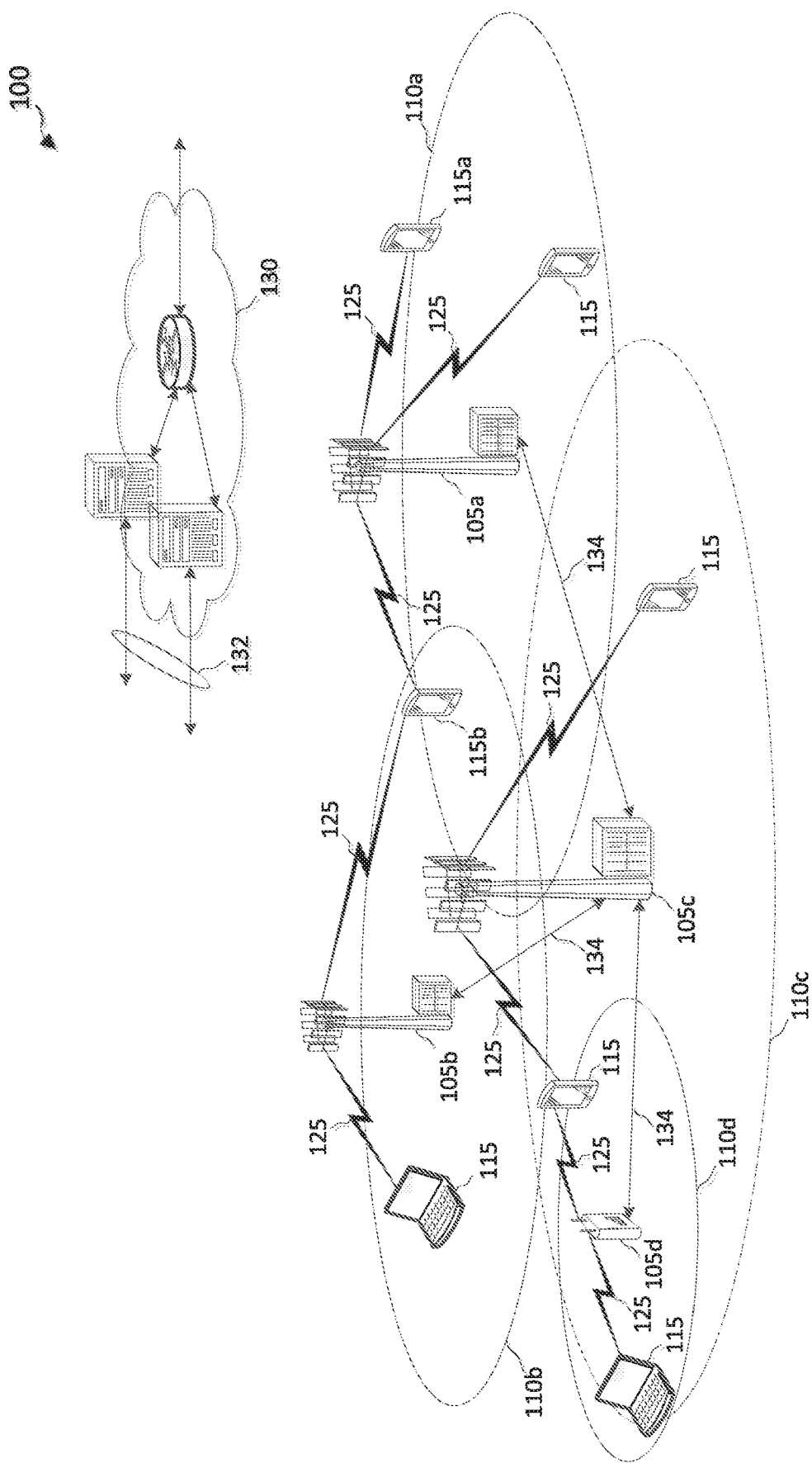
FIG. 1 illustrates a wireless communication network according to embodiments of the disclosure.

FIG. 1 illustrates a wireless communication network 100 according to embodiments of the disclosure. Network 100 includes BSs 105, UEs 115, and a core network 130. In some embodiments, network 100 operates over a shared spectrum. The shared spectrum may be unlicensed or partially licensed to one or more network operators. Access to the spectrum may be limited and may be controlled by a separate coordination entity. In some embodiments, network 100 may be a LTE or LTE-A network. In yet other embodiments, the network 100 may be a millimeter wave (mmW) network, a new radio (NR) network, a 5G network, or any other successor network to LTE. Network 100 may be operated by more than one network operator. Wireless resources may be partitioned and arbitrated among the different network operators for coordinated communication between the network operators over the network 100.

BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from UE 115 to BS 105, or downlink (DL) transmissions, from BS 105 to UE 115. UEs 115 may be dispersed throughout network 100, and each UE 115 may be stationary or mobile. UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

BSs 105 may communicate with the core network 130 and with one another. Core network 130 may provide user authentication, access authorization, tracking, Internet Protocol (IP) connectivity, and other access, routing, or mobility functions. At least some of BSs 105 (e.g., which may be an example of an evolved NodeB (eNB) or an access node controller (ANC)) may interface with core network 130 through backhaul links 132 (e.g., S1, S2, etc.) and may perform radio configuration and scheduling for communication with UEs 115. In various examples, BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes an UL subframe in an UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. An UL-centric subframe may include a longer duration for UL communication than DL communication.

Figure 2:
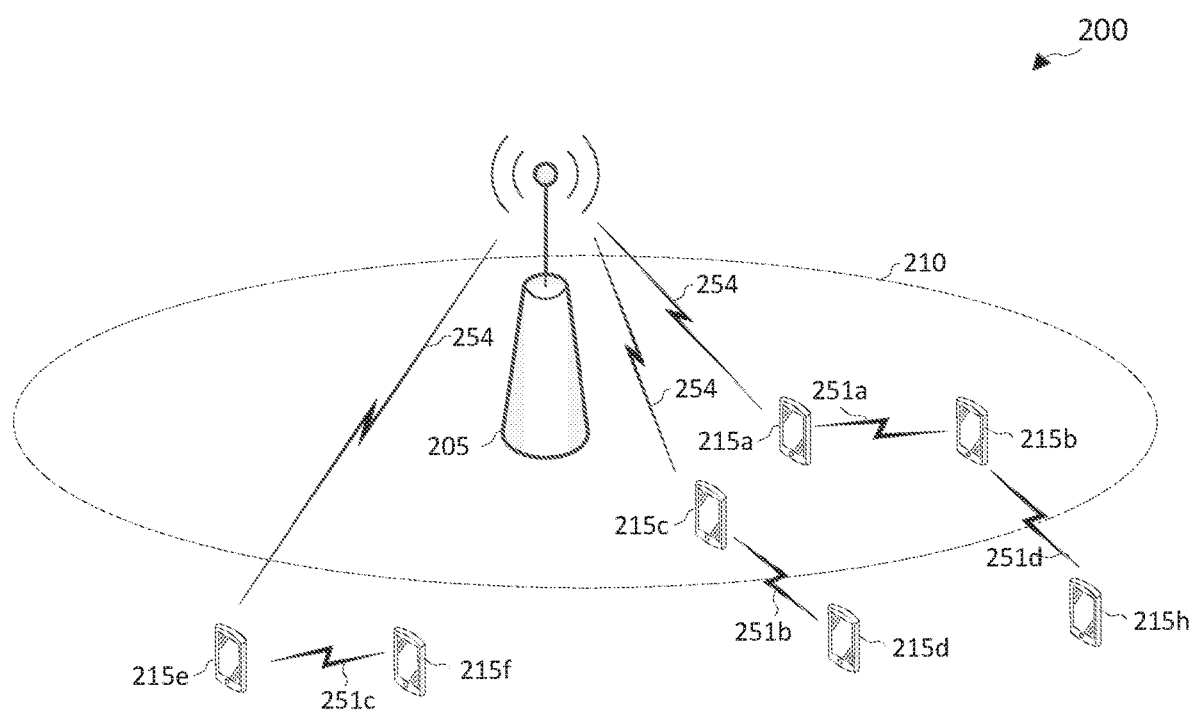
FIG. 2 illustrates an example of a wireless communications network that provisions for sidelink communications according to embodiments of the disclosure.

FIG. 2 illustrates an example of a wireless communication network 200 that provisions for sidelink communications according to embodiments of the disclosure. Network 200 may be similar to the network 100. FIG. 2 illustrates one BSs 205 and seven UEs 215 for purposes of simplicity of discussion, though it will be recognized that embodiments of the disclosure may scale to many more UEs 215 and/or BSs 205. BS 205 and the UEs 215 may be similar to the BSs 105 and the UEs 115, respectively.

In network 200, some UEs 215 may communicate with each other in peer-to-peer communications over sidelinks 251. For example, a UE 215a may communicate with a UE 215b over a sidelink 251a. UE 215a and 215b are within the coverage area 210 of BS 205. In another example, a UE 215c may communicate with a UE 215d over a sidelink 251b. UE 215c is inside coverage area 210 of BS 205 and acts as a relay that extends coverage to UE 215d which is outside of the coverage area. In another example, a UE 215e may communicate with a UE 215f over sidelink 251c. UE 215e and 215f are both outside of coverage area 210 but may communicate with each other for mission critical applications or in cases of public safety. In another example, UE 215b may communicate with a UE 215h over sidelink 251d. UE 215b is within coverage area 210 while UE 215h is outside of the coverage area 210. Sidelinks 251 may be unicast bidirectional links, in some embodiments.

Some of the UEs 215 (e.g., the UEs 215a, 215c, and 215e) may also communicate with the BS 205 via communication links 254 (e.g., including uplink and downlink) similar to the communication links 125. Links 254 may also be referred to as direct communication links or Uu links 254. The peer-to-peer communications may include forward data transmissions over sidelinks 251 in a forward link direction and feedback transmissions over sidelinks 251 in a reverse link direction.

To provision for sidelink for peer-to-peer communications, BS 205 may schedule resources that UEs 215 may use for sidelinks communications. Alternatively, BS 205 may generate a configuration that pre-configures the resources for sidelink communications and may communicate the configuration to UEs 215. UEs 215 may then use the configuration to select the resources and schedule sidelinks 251 with other UEs 215 over the selected resources.

In some embodiments, transmissions over links 254 and sidelinks 251 may be on the same or different carriers. For example, BS 205 may communicate with UE 215a over link 254 on a carrier and UE 215a may communicate with UE 215b over sidelink 251a on the same carrier. In another example, BS 205 may communicate with UE 215c over link 254 on one carrier and UE 215c may communicate with UE 215d over sidelink 251b on a different carrier.

In some embodiments, when links 254 and sidelinks 251 coexist on a carrier or on a number of carriers, links 254 and sidelinks 251 share resources and downlink and/or uplink preemption may be considered. Downlink and/or uplink preemption is a technique that reassigns resources among UEs 215. For example, BS 205 may reclaim resources that BS 205 previously assigned to UE 215a and re-assign these resources to UE 215c. In the downlink preemption, BS 205 may transmit a preemption indication, which may be an indicator, over a physical downlink control channel (PDCCH) to UE 215a that BS 205 is reclaiming some of the resources that BS 205 may use for downlink transmission to UE 125a. Once UE 215a receives the preemption indication, UE 215a may set bits, ratio of the bits (e.g., the log-likelihood ratio of the bits), etc., in a decoding vector associated with the resources indicated in the preemption indication to zero. This prevents UE 215a from decoding the resources and communicating using the resources and allows BS 205 to reclaim and reassign the resources to other UEs 215.

In an uplink preemption, BS 205 may transmit an uplink preemption indication over the PDCCH to UE 215a. The preemption indication may be an indicator that indicates to UE 215a that BS 205 suspends the resources designated in the preemption indication and that UE 215a may not use these resources for uplink transmission to BS 205. For example, suppose UE 215c has a higher priority than UE 215a for communicating with BS 205 and BS 205 requires resources for communication with UE 215c that BS 205 has previously assigned to UE 214a. BS 205 may reassign the resources to UE 215c. BS 205 may also transmit an uplink preemption indication to UE 215a that preempts UE 215a from using the resources previously assigned to UE 215a because BS 205 has reassigned these resources to UE 215c. In this way, UE 215a and UE 215c may not use the same resources and interfere with each other while transmitting to BS 205.

As discussed above, UEs 215 may communicate with other UEs 215 over sidelinks 251. The embodiments discussed below describe techniques that may reallocate resources assigned to sidelinks 251 when BS 205 generates a downlink or uplink preemption indication that preempts transmission of resources between BS 205 and UEs 215. Further, although the embodiments below describe techniques for preempting resources for uplink transmission, the embodiments are also applicable for preempting resources for downlink transmission.

In an embodiment, suppose BS 205 assigned resources to UE 215a for uplink communication between BS 205 and UE 215a, and for communication between UE 215a and 215b. Next, BS 205 may transmit a preemption indication that preempts an uplink transmission using the resources from UE 215a to BS 205 because UE 215c may require the resources. In one embodiment, when UE 215a receives an uplink preemption indication from BS 205, the preemption indication may not impact communication between UE 215a and UE 215b. In this case, UE 215a may not transmit on the preempted resources to BS 205, but may continue to transmit on the preempted resources over sidelink 251a to UE 215b. In another embodiment, when UE 215a receives an uplink preemption indication from BS 205, the preemption indication may also impact communication between UE 215a and UE 215b. In this case, UE 215a may stop transmitting on the preempted resources to BS 205, and may also stop transmitting on the preempted resources over sidelink 251a to 215b.

In an embodiment, whether resources used by sidelinks 251 may be preempted when BS 205 transmits a preemption indication may depend on resource allocation and the mode of operation of UEs 215. For example, when UE 215a autonomously identifies a set of resources for transmission between UE 215a and BS 205 over link 254, and another set of resources for transmission between UE 215a and UE 215b over sidelink 251a, then the preemption indication that preempts transmission using resources between BS 205 and UE 215a, may not preempt transmission using resources over sidelink 251l. This is because BS 205 may not know the resources that UE 215a identified for sidelink 251a. In another example, when BS 205 schedules the resources for UE 215a for link 254 and sidelink 251, then preemption indication may preempt the transmission using resources on link 254 and sidelink 251a.

In another example, the preemption indication may not impact transmission using resources between UE 215a and UE 215b over sidelink 251a when the transmission is over an unlicensed band or over another operator's band. For example, suppose the resources that transmit communications over link 254 between BS 205 and UE 215a belong to a band of the first operator, and the resources that transmit communications over sidelink 251a between UE 215a and UE 215b also belong to a band of the first operator. In this case, when BS 205 transmits a preemption indication, then preemption indication may preempt the transmission over the resources in link 254 and sidelink 251a. In another example, suppose the resources transmitting communication over link 254 between BS 205 and UE 215a belong to a band of the first operator, and the resources transmitting communication over sidelink 251a between UE 215a and UE 215b belong to a band of the second operator. In this case, when BS 205 issues a preemption indication, the preemption indication may prevent the transmission using resources over link 254 between BS 205 and UE 215a, but not the transmission using resources over sidelink 251a between UE 215a and UE 215b.

In another example, when BS 205 issues a preemption indication, the preemption indication may impact the transmission between UE 215a and UE 215b over sidelink 251a depending on whether a transmission is made using a unicast, groupcast or broadcast mode. For example, if the transmission is made using a unicast mode, the preemption indication may impact the transmission over sidelink 251a. In another example, if the transmission is made in a group cast or broadcast mode, the preemption indication may not impact the transmission over sidelink 251a. This is because UE 215a that is transmitting in a groupcast or broadcast mode may be transmitting over sidelinks 251 to multiple UEs 215 (not shown) and preempting the transmission may impact a large number of UEs 215.

In another embodiment, whether the preemption indication may preempt resources used by sidelinks 251 may depend on a priority of sidelink transmission between UEs 215. For example, suppose the transmission using resources over sidelink 251a between UE 215a and UE 215b has high priority, then preemption indication from BS 205 may not affect the resources used for transmission over sidelink 251a. On the other hand, suppose the transmission using resources over sidelink 251a between UE 215a and UE 215b has low priority, then preemption indication from BS 205 may preempt the transmission using resources over sidelink 251a.

In an embodiment, the priority of the transmission between UE 215a and UE 215b may be based on data. In this case, UE 215a may derive the priority from a MAC logical channel prioritization rules because UE 215a may identify a logical channel that includes the data transmitted from UE 215a to 215b and may use the logical channel to identify the priority associated with the logical channel Based on the priority in the logical channel, UE 215a may determine whether the priority is high priority or low priority.

In an embodiment, the priority of the transmission between UE 215 and UE 215b may be based on the priority allocated to the resources. For example, when BS 205 may assign resources to sidelink 251*a*, BS 205 may include an identifier in downlink control information (DCI) that includes priority and indicates that the transmissions over the resources are high priority or low priority. In yet another embodiment, when BS 205 may generate resource pool configurations for UE 215*a*, and may include priority in the resource pool configuration. As discussed above, the preemption indication may not affect resources allocated to sidelink 251 when the priority is a high priority, or is above a priority threshold, in some instances.

In another embodiment, uplink preemption may be configured using the DCI in the PDCCH. For example, BS 205 may include a preemption indication in the DCI for link 254 and sidelinks 251. The UE 215, such as UE 215*a* may monitor DCI for the preemption indication for link 254 and sidelink 251. In another example, the DCI that carries the preemption indication may be the same DCI for link 254 and sidelink 251. Further, the preemption indication may be a bit sequence with a portion of the bits allocated to the preemption indication for link 254 and a portion of the bits allocated to preemption indication for sidelink 251. In another instance, the PDCCH that includes the preemption indication for link 254 and sidelinks 251 may be separate. The DCI that includes the preemption indication may also have different format or size, and different radio network temporary identifiers (RNTIs). Further the DCI that includes the preemption indication may have different configurations, e.g., have different PDCCH monitoring occasions, different search space set configuration, etc.

In another embodiment, BS 205 or UEs 215 may select one of the preemption techniques described above. For example, the BS 205 and/or the UEs 215 may be configured to use a particular technique or may be configured to dynamically switch between techniques based on certain network conditions, resource availability (e.g., time-frequency resource availability), power and/or device operating conditions, and/or the like.

In an embodiment, when BS 205 transmits a preemption indication to UE 215, UE 215 may determine when resources (e.g. slot or time resources) may be reallocated. For example, the slot or time resources for sidelinks 251 may not be contiguous or the preemption indication may be aligned with slots for resources used by link 254 and not with slots for used by sidelinks 251. Accordingly, after UE 215 receives the preemption indication, UE 215 may determine the slots for which UE 215 may apply the preemption indication. For example, suppose the periodicity in preemption indication is 2 slots and UE may receive the preemption indication in slot 2*n, where n is an integer. In this case, UE 215 may determine whether to apply the preemption indication to slots 2*n, 2*n+1, 2n+1, or 2n+2 in sidelinks 251. For example, suppose resources for link 254 are in slots 2*n, and resources for sidelink 251 are in slots 2n+1 and 2n+2. If the preemption indication is for link 254, then UE 215 may apply the preemption indication to resources in 2n and 2n+1. Alternatively, if the preemption indication is for sidelink 251, then UE 215 may apply the preemption indication to slots 2n+1 and 2n+2 (or to slots 2n and 2n+1 in some instances). Further, the action time for the preemption indication may be based on slots used for sidelink 251.

Further, although the embodiments above are described with respect to uplink preemption indication, the embodiments also apply to a downlink preemption indication that may reallocate resources for downlink communications between BS 205 and UEs 215.

In some embodiments, the uplink or downlink preemption indication may also be transmitted by UEs 215 instead of BS 205. For example, suppose UE 215*a* may communicate with UE 215*b* over sidelink 251*a*, and UE 215*b* may communicate with UE 215*h* over sidelink 251*d*. In this case, UE 215*a* may generate a preemption indication that may reallocate resources between UE 215*b* and 215*h*.

As discussed above, the preemption indication may not always reallocate resources allocated to sidelinks 251. As a result, links 254 and/or sidelinks 251 may transmit using the same resources, and as a result may interfere with each other. To reduce interference, the embodiments below describe techniques for increasing accuracy of the transmission over link 254 and/or sidelinks 251 that use the same resources.

In some embodiments, BS 205 may increase accuracy of the transmission over link 254 by removing a portion of the resources that are used by sidelinks 251. For example, suppose BS 205 issues an uplink preemption indication to UE 205*a*, and the preemption indication preempts transmissions using resources over link 254 from UE 215*a* to BS 205. In this case, the resources that correspond to the preemption indication may be reassigned to link 254 between BS 205 and UE 215*c*. However, UE 215*a* has not reassigned the same resources on sidelink 251*a*, and sidelink 251*a* still uses the resources for transmissions between UE 215*a* and 215*b*. Accordingly, the transmissions between UE 215*c* and BS 205, and transmission between UE 215*a* and 215*b* may interfere with each other. In one embodiment, to increase the accuracy of the transmission using resources over link 254 between BS 205 and UE 205*c*, BS 205 may remove a portion of the resources from the resources set aside for sidelink 251*a*. For example, BS 205 may time division multiplex the resources transmitted on link 254 between UE 215*c* and BS 205, and on sidelink 251*a* between UE 215*a* and UE 215*b*. In this case, link 254 and sidelink 251*a* may not use the resources simultaneously and do not interfere with each other.

In another embodiment, the preemption indication may span a portion of symbols or slots in the resources. The spanned portion of these symbols or slots may be designated for sidelink 251*a*. Accordingly, when UE 205*a* receives the preemption indication, UE 215*a* may remove and/or prevent use of the resources that are designated for link 254 and transmit on the portion of the resources designated for sidelink 251*a*. Similarly, when UE 215*c* receives the preemption indication, UE 215*c* may remove and/or prevent use of the resources designated for sidelink 251*a* and transmit using the portion of the resources designated for link 254. For example, suppose the preemption indication may span a portion of slots in the resources associated with sidelink 251*a*. In this case, UE 215*a* may remove the slots associated with sidelink 251*a* from the group of resources and may group the remaining resources into a configurable number of groups. In some instances, the grouping may be according to the number of bits that may be transmitted over link 254 or another number that may be included in the preemption indication. The UE 215 may then map one bit within the bits to the groups. The slots with the bits that are set to "1" may be preempted, and vice versa.

Another way to minimize interference when links 254 and sidelinks 251 use the same resources is for BS 205 to boost power on one of UEs 215 for uplink transmission. In one embodiment, BS 205 may use an open-loop parameter in DCI to transmit the power boosting information for certain transmissions, such as an ultra-reliable low latency communication (URLLC) uplink transmission. For example, BS 205 may boost power that UE 215*a* uses during uplink of the URLLC transmission by setting an open-loop parameter in the DCI and transmitting the DCI in the PDCCH to UE 215*a*. UE 215*a* may receive the DCI and use the open-loop parameter to boost power for URLLC transmission.

In another embodiment, BS 205 may use a transmission power command (TPC) in the DCI to increase the power range. For example, the DCI may include a field for TPC that indicates the transmission power level for UE 215. BS 205 may extend the TPC field to include entries that indicate a range for the power boost. Example entries may be 3 db, 6 db, 9 db, etc. Once UE 215 receives the DCI, UE 215 may decode the TPC field and boost power for a transmission as specified in the TPC.

In another embodiment, BS 205 may use either the open-loop parameter or the TPC field to boost power. For example, during a dynamic grant (DG) PUSCH, BS 205 may indicate to UE 215 to use either the open-loop parameter or TPC field to boost power.

In another example, UE 215 may derive its transmission power from a time/frequency resource indicated by the group common DCI. For example, UE 215 may derive the transmission power from the group common DCI for an active configured grant (CG) PUSCH transmission.

In another embodiment, the power boosting information may also be applied to sidelinks 251. For example, UEs 215 may be configured to receive DCI from BS 205 that carries power boosting information for sidelinks 251 in the open-loop parameter or TPC field. In some embodiments, this power boosting technique may be applied in configurations where BS 205 may generate a configuration with resource allocation for sidelinks 251. In this case, when BS 205 sends the configuration to UEs in the DCI, BS 205 may also include an open-loop parameter or TPC field that includes the power boosting information as part of the configuration.

In another embodiment, UEs 215 may be configured to receive a group common PDCCH that includes time/frequency resources for boosting power. In this case, different DCIs with different RNTIs or other fields may be transmitted to UEs 215 to indicate power boosting from different transmission pools. Alternatively, a group-common DCI may carry power boosting commands for each UE 215 and multiple transmission resource pools. In some embodiments, this power boosting technique may be applied to configurations where BS 205 generates a configuration that allocates resources for UEs 215 and sends the configuration to UEs 215.

In another embodiment, UEs 215 may be configured to receive a one group-common PDCCH that includes power boosting information for links 254 and sidelinks 251. In this case, whether UEs 215 may apply power boosts to links 254 or sidelinks 251 may depend on whether preemption indication resulted in resource reallocation for links 254 or sidelinks 251. For example, suppose the power boosting information in the PDCCH may span a portion of slots in the resources associated with sidelink 251*a* between UE 215*a* and UE 215*b*. In this case, UE 215*a* may remove the slots associated with sidelink 251*a* from the group of resources associated with PDCCH and group the remaining resources into a configurable number of groups. As discussed above, the grouping may be according to the number of bits that may be transmitted over link 254 or another number that may be included in the preemption indication. The UE 215 may then map one bit within the bits to the groups. The slots with the bits that are set to "1" may receive a power boost or vice versa.

Figure 3:
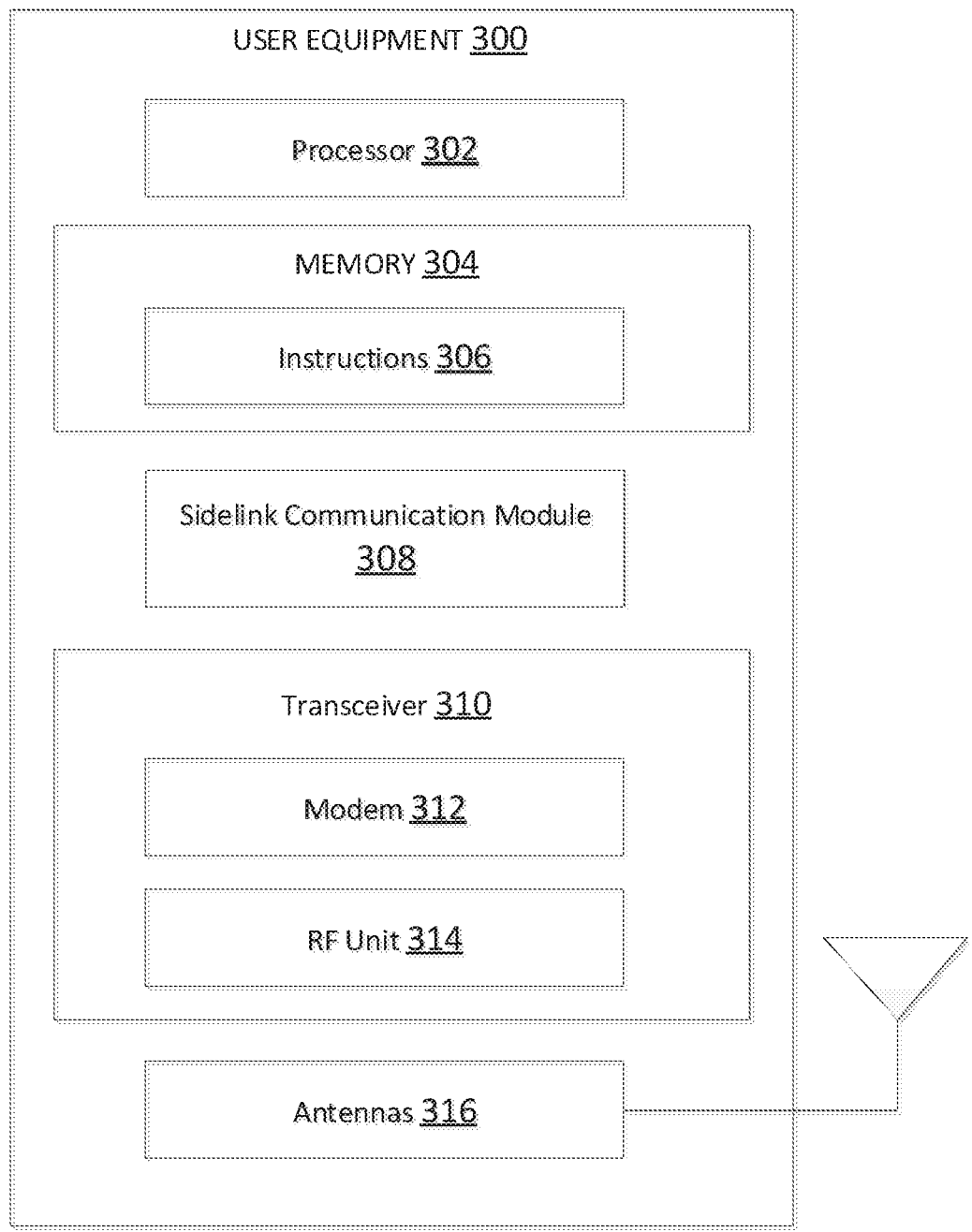
FIG. 3 is a block diagram of an exemplary user equipment (UE) according to embodiments of the disclosure.

FIG. 3 is a block diagram of an exemplary UE 300 according to embodiments of the present disclosure. The UE 300 may be a UE 115 or 215 as discussed above. As shown, the UE 300 may include a processor 302, a memory 304, a sidelink communication module 308, a transceiver 310 including a modem subsystem 312 and a radio frequency (RF) unit 314, and an antenna 316. These elements may be in direct or indirect communication with each other, for example via one or more buses or other communication medium.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 215 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink communication module 308 may be implemented via hardware, software, or combinations thereof. For example, the sidelink communication module 308 may be implemented as a processor, circuit, and/or instructions 306 stored in the memory 304 and executed by the processor 302. The sidelink communication module 308 may be used for various aspects of the present disclosure. For example, the sidelink communication module 308 may be configured to identify resources allocated by a BS (e.g., BS 105, BS 205) and responsive to a preemption indication, prevent (e.g., preempt) the use of the allocated resources for communication over either a communication link and a sidelink or prevent the use of the allocated resources for communication over the communication link, while maintaining the resources for communication over the sidelink, as described in greater detail herein.

As shown, the transceiver 310 may include the modem subsystem 312 and the RF unit 314. The transceiver 310 can be configured to communicate bi-directionally with other devices, such as the BSs 105 and 205. The modem subsystem 312 may be configured to modulate and/or encode the data from the memory 304 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 215 or a BS 205. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 215 to enable the UE 215 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of RTS and/or CTS signals according to embodiments of the present disclosure. The antenna 316 may further receive data messages transmitted from other devices. This may include, for example, reception of RTS and/or CTS signals according to embodiments of the present disclosure. The antenna 316 may provide the received data messages for processing and/or demodulation at the transceiver 310. Although FIG. 3 illustrates antenna 316 as a single antenna, antenna 316 may include multiple antennas of similar or different designs in order to sustain multiple transmission links. The RF unit 314 may configure the antenna 316.

Figure 4:
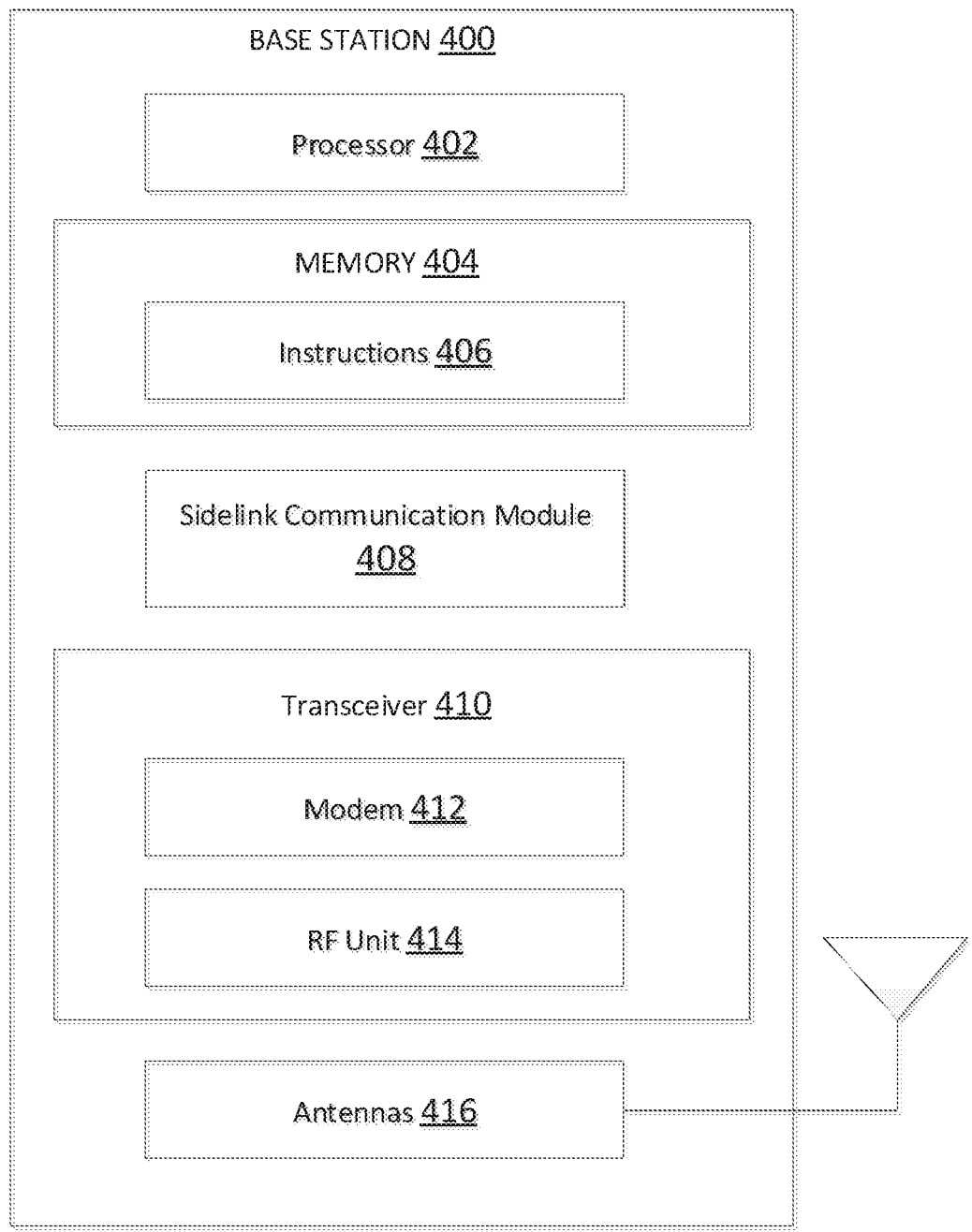
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 or 205 as discussed above. A shown, the BS 400 may include a processor 402, a memory 404, a sidelink communication module 408, a transceiver 410 including a modem subsystem 412 and a RF unit 414, and an antenna 416. These elements may be in direct or indirect communication with each other, for example via one or more buses or other communication medium.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The sidelink communication module 408 may be implemented via hardware, software, or combinations thereof. For example, the sidelink communication module 408 may be implemented as a processor, circuit, and/or instructions 406 stored in the memory 404 and executed by the processor 402. The sidelink communication module 408 may be used for various aspects of the present disclosure. For example, the sidelink communication 408 may be configured to identify resources to allocate for communication with a UE (e.g., the UEs 115, 215, and/or 300) and/or for sidelink communication among UEs. The sidelink communication module 408 may further be configured to generate a preemption indication to reallocate resources from a first UE, such as UE 215a, to a second UE, such as UE 215c, as described in greater detail herein.

As shown, the transceiver 410 may include the modem subsystem 412 and the RF unit 414. The transceiver 410 can be configured to communicate bi-directionally with other devices, such as the UEs 115 and 215 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 215. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 205 to enable the BS 205 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of information to complete attachment to a network and communication with a camped UE 215 according to embodiments of the present disclosure. The antenna 416 may further receive data messages transmitted from other devices and provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5:
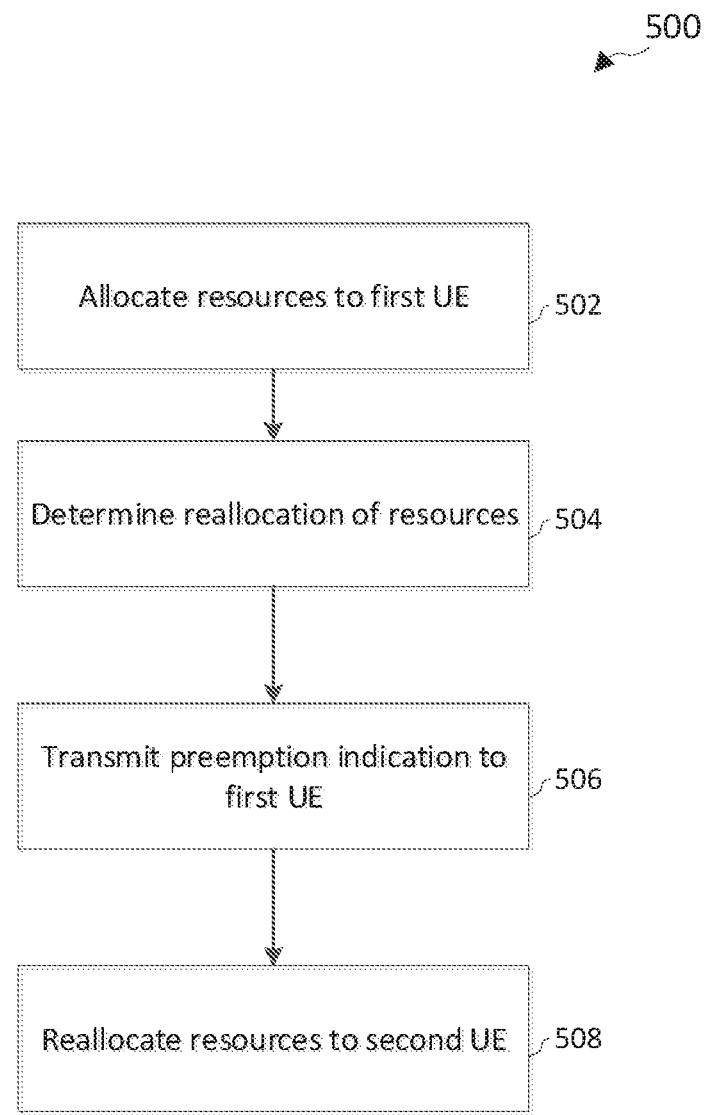
FIG. 5 is a flow diagram of a process for transmitting a preemption indication according to embodiments of the present disclosure.

FIG. 5 is a flow diagram of a process 500 for transmitting a preemption indication, such as an uplink preemption indication or a downlink preemption indication, according to some aspects of the present disclosure. Aspects of the process 500 can be executed by a computing device (e.g., a processor, processing circuit, and/or other suitable component) of a wireless communication device or other suitable means for performing the steps. For example, a wireless communication device, such as the BS 105a-c, 205, and/or 400, may utilize one or more components, such as the processor 402, the memory 404, the sidelink communication module 408, the transceiver 410, the modem 412, and the one or more antennas 416, to execute the steps of process 500. As illustrated, the process 500 includes a number of enumerated steps, but aspects of the process 500 may include additional steps before, after, and in between the enumerated steps. In some aspects, one or more of the enumerated steps may be omitted or performed in a different order.

At block 502, a BS (e.g., BS 400) may allocate resources to a first UE (e.g., UE 300), such as UE 215*a*. For example, the BS may assign and/or schedule transmission resources (e.g., in the form of time-frequency resource blocks) to the first UE for DL and UL transmissions in a network, such as network 100 and/or network 200. In this way, the BS may allocate resources for communication between the BS and the first UE over a communication link (e.g., link 125, link 254, a Uu link). Further, the BS may schedule resources that the first UE may use for sidelinks communications. In this way, the BS may schedule resources that the first UE may use for sidelink communication with an additional UE (e.g., UE 300), such as UE 215*b*, over a sidelink (e.g., 251). In some aspects, the resources allocated to the first UE for communication over the communication link and the sidelink may be the same or may at least partially overlap.

At block 504, the BS may determine a reallocation of the resources allocated to the first UE (e.g., the resources allocated at block 502). In some aspects, the BS may determine the reallocation of the allocated resources based on a communication priority associated with the first UE. For example, the BS may determine that a second UE (e.g., UE 300), such as the UE 215*c*, has a higher priority than the first UE, such as UE 215*a*, for communicating with BS. The BS may then determine to reallocate the resources from the first UE to the second UE to facilitate communication between the second UE and the BS with the allocated resources. In some aspects, the BS may determine the communication priority of the first UE and the second UE for communicating with the BS based on respective device configuration data, a priority of the data to be communicated to or from the respective device, a time elapsed since a previous communication with the respective device, the priority techniques described herein, and/or the like as discussed above in relation to FIG. 2.

At block 506, the BS may transmit a preemption indication to the first UE. The preemption indication may indicate that the BS is reclaiming the resources allocated to the first UE. In this way, the preemption indication may indicate that the resources allocated to the first UE will no longer be available to the first UE for communication with the BS. The preemption indication allows the BS to reassign the reclaimed resources to a different UE, such as the second UE. In downlink preemption and/or uplink preemption, BS may transmit the preemption indication over a PDCCH to the first UE. Further, the preemption indication may be configured to identify the particular resources being reclaimed by the BS. For example, the preemption indication may include information and/or one or more data fields corresponding to slot or time resources to be reallocated. To that end, in some aspects, the preemption indication may be aligned with some or all of the slots to be reallocated. Once the first UE receives the preemption indication, the first UE may be prevented (e.g., preempted) from decoding the resources and/or communicating using the resources identified by the preemption indication. As described below, in some embodiments, the first UE may be prevented from communicating only with the BS (e.g., communicating over a communication link) using the resources and may continue to use the resources for sidelink communication with the additional UE (e.g., a third UE), such as UE 215*b*, using the resources. In other aspects, the first UE may be prevented from using the resources for communication with the BS, as well as sidelink communication with the third UE. To that end, the BS may be configured to transmit the preemption indication over a single DCI or over a first DCI and a second DCI (e.g., via PDCCH).

At block 508, the BS may reallocate the resources to the second UE, such as UE 215*c*. Thus, as described above, the BS may assign and/or schedule the transmission resources (e.g., in the form of time-frequency resource blocks) to the second UE for DL and/or and UL transmissions in a network, such as network 100 and/or network 200. In this way, the BS may allocate resources for communication between the BS and the second UE over a communication link (e.g., link 125, link 254).

For the purposes of example, the process 500 is described herein as being performed by a BS. However, it may be appreciated that embodiments are not limited thereto and that a UE (e.g., UE 300) may be used to perform aspects of the process 500. For example, in some embodiments, the BS may generate a configuration that pre-configures the resources for sidelink communications and may communicate the configuration to the first UE. The first UE may then transmit the configuration information and/or resource allocation information determined based on the configuration information to the second UE and a third UE (e.g., at block 502). To that end, the first UE may be configured to communicate with the second UE over a first sidelink (e.g., sidelink 251), and the first UE may be configured to communicate with a third UE over a second sidelink. In this case, the first UE may generate and transmit a preemption indication (e.g., at block 506) and may reallocate resources between the second and third UE (e.g., at block 508).

Figure 6:
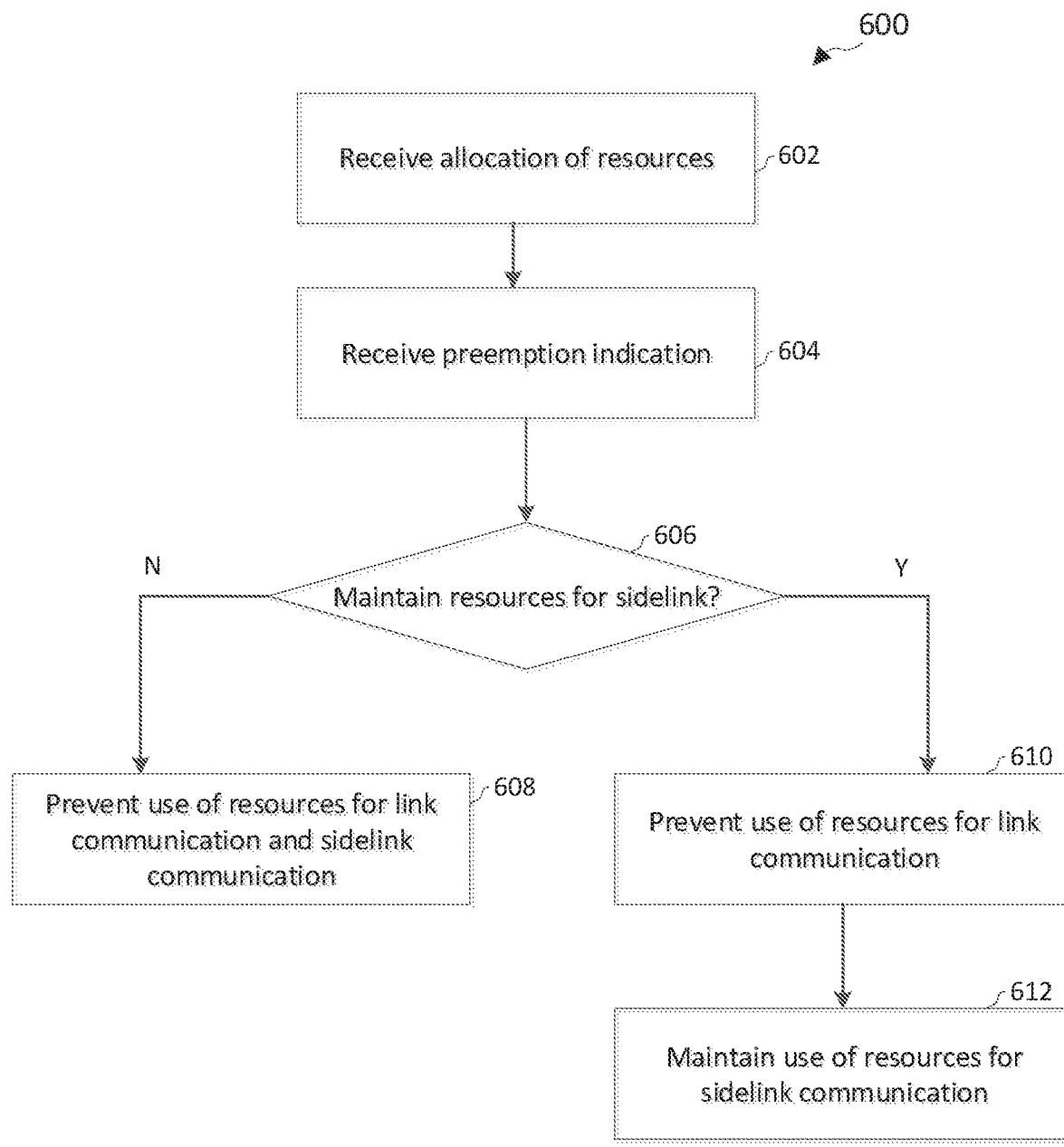
FIG. 6 is a flow diagram of a process for preventing the use of resources at a UE according to embodiments of the present disclosure.

FIG. 6 is a flow diagram of a process 600 for reallocating resources at a UE (e.g., UE 300) based on a preemption indication, such as an uplink preemption indication or a downlink preemption indication, according to some aspects of the present disclosure. Aspects of the process 600 can be executed by a computing device (e.g., a processor, processing circuit, and/or other suitable component) of a wireless communication device or other suitable means for performing the steps. For example, a wireless communication device, such as the UE 115, 215, and/or 300, may utilize one or more components, such as the processor 302, the memory 304, the sidelink communication module 308, the transceiver 310, the modem 312, and the one or more antennas 316, to execute the steps of process 600. As illustrated, the process 600 includes a number of enumerated steps, but aspects of the process 600 may include additional steps before, after, and in between the enumerated steps. In some aspects, one or more of the enumerated steps may be omitted or performed in a different order. For the purposes of example, the process 600 is described herein as being performed by the first UE described above with reference to process 500 of FIG. 5. However, it may be appreciated that embodiments are not limited thereto and that any suitable wireless communication device may be used to perform aspects of the process 600.

At block 602, a UE (e.g., UE 300) may receive allocation of resources (e.g., in the form of time-frequency resource blocks) for DL and UL transmissions in a network, such as network 100 and/or network 200. For example, the first UE may receive assignment or scheduling information associated with the resources transmitted from the BS, as described with respect to block 502 of FIG. 5. Accordingly, the allocation of resources may specify resources for communication between the first UE and the BS over a communication link (e.g., communication link 125, link 254). Moreover, the allocation of resources may specify resources for sidelink communication between the first UE and the third UE (e.g., UE 215*a* and UE 215*b*, respectively) over a sidelink. In some embodiments, the first UE may receive allocation of the same resources for communication over the communication link and the sidelink, and in other embodiments, the first UE may receive allocation of the separate resources for communication over the communication link and the sidelink, respectively.

At block 604, the first UE may receive a preemption indication. The first UE may receive the preemption indication from the BS. The preemption indication may indicate that the BS is reclaiming the resources allocated to the first UE at block 602. In this way, the preemption indication may indicate that the resources allocated to the first UE will no longer be available to the first UE for communication with the BS, which may allow the BS to reassign the reclaimed resources to the second UE, as described herein.

In some embodiments, the first UE may receive the preemption indication via a PDCCH. For example, the first UE may receive the preemption indication in the DCI via the PDCCH. Accordingly, the first UE may be configured to monitor the DCI for the preemption indication. Moreover, the preemption indication may be associated with a communication link for communication between the first UE and the BS, a sidelink for sidelink communication between the first UE and the third UE, or both. To that end, the preemption indication may be a bit sequence with a portion of the bits allocated to a preemption indication for the communication link and a portion of the bits allocated to a preemption indication for the sidelink. Additionally or alternatively, the first UE may be configured to monitor a single DCI for the preemption indication or may be configured to monitor a first DCI for a preemption indication associated with the communication link and a second DCI for a preemption indication associated with the sidelink to receive the preemption indication. In some aspects, the first UE may be configured to monitor a first DCI and a second DCI in a PDCCH to receive the preemption information. In this way, the preemption indication may indicate that the resources allocated to the first UE will no longer be available to the first UE for communication over the communication link, for sidelink communication over the sidelink, or both. More specifically, the first UE may determine, based on the preemption indication, the particular resources being reclaimed by the BS. For example, the preemption indication may include information and/or one or more data fields corresponding to slot or time resources to be reallocated.

At block 606, after receiving the preemption indication, the first UE may determine whether to maintain allocation of the resources allocated to the first UE (e.g., allocated at block 602) for sidelink communication. In some aspects, the first UE may be configured to always maintain allocation of the resources allocated to the first UE for sidelink communication. In such embodiments, the UE first 300 may continue to use the sidelink for sidelink communication with the third UE even after the resources allocated to the first UE for communication with the BS are reallocated to the second UE, as described below. Alternatively, the first UE may be configured to always reallocate the resources allocated to the first UE for sidelink communication. Further, in some aspects, the UE first 300 may be configured to determine whether to maintain allocation of the resources allocated for sidelink communication based on a number of factors, such as a transmission mode of the first UE, a resource allocation mode of the first UE, a frequency band and/or operator associated with the sidelink communication, a priority of the sidelink communication, and/or the like.

In some embodiments, for example, the first UE may be configured to maintain allocation of the resources allocated for sidelink communication when the first UE is transmitting in a broadcast or groupcast mode. The first UE may further maintain the allocation when the sidelink communication is transmitted in a different frequency band, such as an unlicensed frequency band or a different operator's frequency band, from the communication over the communication link to the BS. In some aspects, the first UE may be configured to maintain the allocation when the priority of the sidelink communication is high and/or a above a certain threshold. On the other hand, the first UE may be configured to preempt the sidelink communication (e.g., reallocate the resources for the sidelink communication) if the first UE is operating in a unicast transmission mode, the sidelink communication is transmitted in the same frequency band as the communication with the BS over the communication link, and/or the priority of the sidelink communication is low and/or below a certain threshold.

Further, in some embodiments, the first UE may be configured to determine whether to maintain the allocation of the resources allocated for sidelink communication based on the preemption indication. For instance, as described above, the preemption indication may be associated with the communication link, the sidelink, or both. Accordingly, the first UE may be configured to determine whether to maintain the allocation of resources for sidelink based on information included in certain bits (e.g., certain fields) of the preemption indication, on a certain DCI, on a PDCCH, and/or the like.

If it is determined, at block 606, that the allocation of resources for sidelink communication will not be maintained, the first UE may prevent the use of the resources for both communication over the link and sidelink communication at block 608. In some embodiments, the first UE may modify a data field associated with the resources, the communication link, the sidelink, or a combination thereof to prevent the use of the resources for communication over the communication link and the sidelink. Moreover, the first UE may modify the data field based in part on the preemption indication, which may identify the resources. As an illustrative example, the first UE may set one or more bits, a ratio of the bits (e.g., the log-likelihood ratio of the bits), etc., in a decoding vector associated with the resources indicated in the preemption indication to zero. By modifying the decoding vector or any other suitable data fields associated with the resources, the first UE may be prevented from both decoding the resources and communicating using the resources, which may allow the BS to reclaim and reassign the resources to the second UE.

If, on the other hand, it is determined that the allocation of resources for sidelink communication will be maintained (e.g., at block 606), the first UE may prevent only the use of the resources for link communication at block 610, while maintaining use of the resources for sidelink communication at block 612. At block 606, the first UE may prevent (e.g., preempt) the use of the resources for link communication by modifying a data field associated with the resources and/or the communication link. For instance, as described above, the UE first 300 may modify a decoding vector or any other suitable data fields to prevent the first UE from decoding the resources and communicating using the resources. Accordingly, the BS may reassign the resources to the second UE.

At block 612, the first UE may maintain use of the resources for sidelink communication with the third UE. In some embodiments, the resources allocated to the UE at block 602 are the same or at least partially overlap for communication with the BS over a communication link and sidelink communication over a sidelink. To that end, the resources reassigned from the first UE to the second UE at block 508 of FIG. 5 (e.g., the resources whose use is prevented at block 610) may be the same as or at least partially overlap with the resources maintained for sidelink communication at block 612. As a result, the communication link and/or the sidelink may transmit using the same resources (e.g., shared resources), which may cause interference. Thus, to reduce interference when the resources are maintained at block 606, the first UE and/or the BS may employ one or more techniques described herein.

According to some aspects, the BS may time division multiplex the shared resources. In this case, the resources may not be used to simultaneously communicate over a communication link and a sidelink. Thus, the first UE may use the time division multiplexing to maintain the use of the resources for sidelink communication.

Further, in some aspects, the shared resources may include a first portion of symbols or slots designated for communication over the communication link and a different second portion of symbols designated for sidelink communication. In such cases, preventing the use of the resources for link communication at block 610 may involve removing the resources designated for the communication over the communication link. Afterwards, maintaining the use of the resources for sidelink communication at block 612 may involve transmitting on the remaining resources designated for sidelink communication.

Additionally or alternatively, the first UE and/or the BS may reduce interference between the communication link and the sidelink by using power boosting information. For example, the first UE may be configured to receive the power boosting information in an open-loop parameter, a TPC field, and/or the like. The power boosting information may boost transmission of data from the BS, the first UE, the second UE, and/or the third UE. In this way, the power boosting information may be used to boost transmission on the communication link 254, the sidelink, or both.

Figure 7:
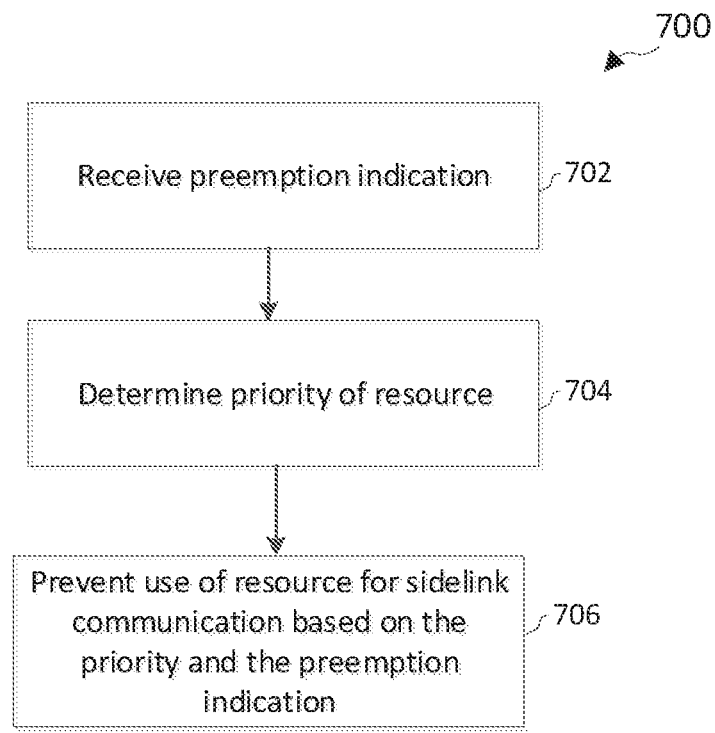
FIG. 7 is a flow diagram of a process for preventing the use of resources at a UE according to embodiments of the present disclosure.

FIG. 7 is a flow diagram of a process 700 for reallocating resources at a UE (e.g., UE 300) based on a preemption indication, such as an uplink preemption indication or a downlink preemption indication, according to some aspects of the present disclosure. Aspects of the process 700 can be executed by a computing device (e.g., a processor, processing circuit, and/or other suitable component) of a wireless communication device or other suitable means for performing the steps. For example, a wireless communication device, such as the UE 115, 215, and/or 300, may utilize one or more components, such as the processor 302, the memory 304, the sidelink communication module 308, the transceiver 310, the modem 312, and the one or more antennas 316, to execute the steps of process 700. As illustrated, the process 700 includes a number of enumerated steps, but aspects of the process 700 may include additional steps before, after, and in between the enumerated steps. In some aspects, one or more of the enumerated steps may be omitted or performed in a different order. For the purposes of example, the process 700 is described herein as being performed by the first UE described above with reference to process 500 of FIG. 5. However, it may be appreciated that embodiments are not limited thereto and that any suitable wireless communication device may be used to perform aspects of the process 700.

At block 702, the first UE may receive a preemption indication. The first UE may receive the preemption indication from the BS. The preemption indication may indicate that the BS is reclaiming resources previously allocated to the first UE. In this way, the preemption indication may indicate that the resources allocated to the first UE will no longer be available to the first UE for communication with the BS, which may allow the BS to reassign the reclaimed resources to the second UE, as described herein. Further and as similarly described above with reference to process 600 of FIG. 6, the first UE may receive the preemption indication via a PDCCH, and the preemption indication may be associated with a communication link (e.g., Uu link) and/or a sidelink.

At block 704, after receiving the preemption indication, the first UE may be configured to determine a priority of the resource. In some embodiments, the priority of the resource may correspond to a priority of sidelink transmission and/or sidelink communication with respect to the first UE. The first UE may determine the priority of the resource based on a priority derived from a MAC logical channel prioritization rules. Thus, as described herein, the first UE may identify a logical channel that includes transmitted from the first UE over the sidelink and may use the logical channel to identify the priority associated with the logical channel. To that end, the priority associated with the logical channel may correspond to the priority of the resource. In an embodiment, an identifier in downlink control information (DCI) may include the priority of the resource. In such embodiments, the first UE may be configured to receive the DCI and retrieve or determine the priority of the resource based on the DCI. In yet another embodiment, the priority of the resource may be included in resource pool configuration. Accordingly, the first UE may be configured to determine the priority of the resource based on the resource pool configuration. Additionally or alternatively, the first UE may determine the priority of the resource on other factors, such as a transmission mode of the first UE, a resource allocation mode of the first UE, a frequency band and/or operator associated with the sidelink communication, and/or the like.

At block 706, the first UE may prevent the use of the resources for sidelink communication. More specifically, the first UE may prevent itself from using the resources for sidelink communication. According to some aspects, the first UE may prevent the use of the resources for the sidelink communication based on the preemption indication and the priority of the resource. The first UE may prevent the use of the resources for sidelink communication in response to determining (e.g., at block 704) that the priority of the resource is low or below a threshold. Additionally or alternatively, the first UE may prevent the use of the resources for sidelink communication in response to the preemption indication being associated with the sidelink and/or in response to receiving the preemption indication.

In some embodiments, the first UE may modify a data field associated with the resources, the sidelink, or a combination thereof to prevent the use of the resources for communication over the sidelink. Moreover, the first UE may modify the data field based in part on the preemption indication, which may identify the resources. As an illustrative example, the first UE may set one or more bits, a ratio of the bits (e.g., the log-likelihood ratio of the bits), etc., in a decoding vector associated with the resources indicated in the preemption indication to zero. By modifying the decoding vector or any other suitable data fields associated with the resources, the first UE may be prevented from both decoding the resources and communicating using the resources for sidelink communication. At block 706, the first UE may additionally prevent the use of the resources for communication between the first UE and the BS over a communication link, as described herein.

Figure 8:
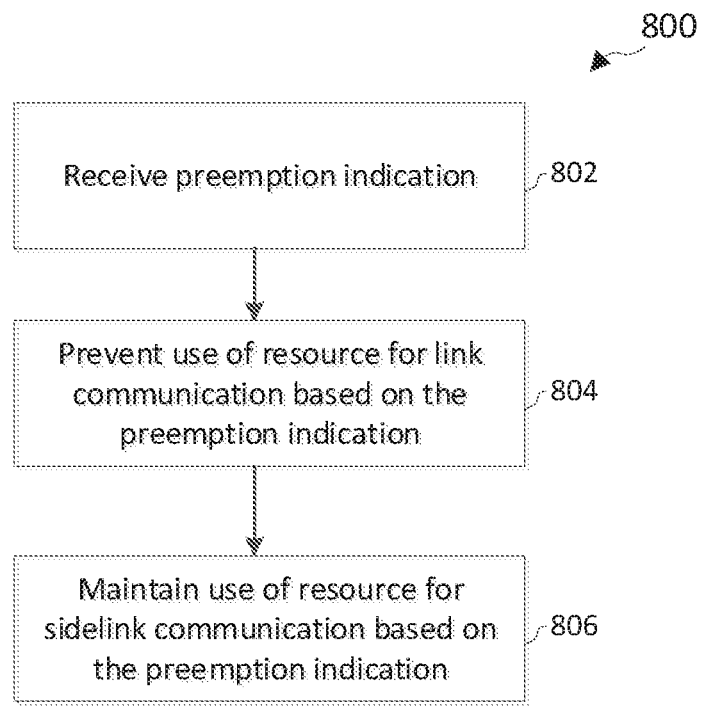
FIG. 8 is a flow diagram of a process for preventing the use of resources at a UE according to embodiments of the present disclosure.

FIG. 8 is a flow diagram of a process 800 for reallocating resources at a UE (e.g., UE 300) based on a preemption indication, such as an uplink preemption indication or a downlink preemption indication, according to some aspects of the present disclosure. Aspects of the process 800 can be executed by a computing device (e.g., a processor, processing circuit, and/or other suitable component) of a wireless communication device or other suitable means for performing the steps. For example, a wireless communication device, such as the UE 115, 215, and/or 300, may utilize one or more components, such as the processor 302, the memory 304, the sidelink communication module 308, the transceiver 310, the modem 312, and the one or more antennas 316, to execute the steps of process 800. As illustrated, the process 800 includes a number of enumerated steps, but aspects of the process 800 may include additional steps before, after, and in between the enumerated steps. In some aspects, one or more of the enumerated steps may be omitted or performed in a different order. For the purposes of example, the process 800 is described herein as being performed by the first UE described above with reference to process 500 of FIG. 5. However, it may be appreciated that embodiments are not limited thereto and that any suitable wireless communication device may be used to perform aspects of the process 800.

At block 802, the first UE may receive the preemption indication from the BS. The preemption indication may indicate that the BS is reclaiming resources previously allocated to the first UE. In this way, the preemption indication may indicate that the resources allocated to the first UE will no longer be available to the first UE for communication with the BS, which may allow the BS to reassign the reclaimed resources to the second UE, as described herein. Further and as similarly described above with reference to process 600 of FIG. 6, the first UE may receive the preemption indication via a PDCCH, and the preemption indication may be associated with a communication link (e.g., Uu link) and/or a sidelink.

At block 804, after receiving the preemption indication, the first UE may prevent the use of the resources for link communication (e.g., direct link communication and/or communication between the first UE and the BS). More specifically, the first UE may prevent itself from using the resources to communicate with the BS over a communication link. In some embodiments, the first UE may modify a data field associated with the resources, the communication link, or a combination thereof to prevent the use of the resources for communication over the communication link. As described herein, by modifying the suitable data fields associated with the resources and/or the communication link, the first UE may be prevented from both decoding the resources and communicating using the resources with the BS, which may allow the BS to reclaim and reassign the resources to the second UE.

At block 806, the first UE may maintain the use (e.g., maintain allocation) of the resources for sidelink communication. More specifically, the first UE may maintain the use of the resources for sidelink communication between the first UE and the third UE over a sidelink. In some embodiments, the first UE may be configured to maintain the use of the resources for sidelink based on one or more factors, which may include the preemption indication. In some embodiments, for example, the first UE may be configured to maintain the use of the resources in response to receiving the preemption indication and/or in response to determining that the preemption indication is not associated with the sidelink, the preemption indication is not associated with the resources and/or the portion (e.g., slots) of the resources used for sidelink communication, and/or the like. The first UE may further maintain the use of the resources for sidelink communication when the first UE is transmitting in a broadcast or groupcast mode. The first UE may further maintain the allocation of the resources for sidelink communication when the sidelink communication is transmitted in a different frequency band, such as an unlicensed frequency band or a different operator's frequency band, from the communication over the communication link to the BS. In some aspects, the first UE may be configured to maintain the allocation when the priority of the sidelink communication is high and/or a above a certain threshold. Moreover, as described herein, when the use of the resources is maintained for the sidelink communication, the resources may be shared for sidelink communication between the first UE and the third UE, as well as for communication over a link between the second UE and the BS. Accordingly, when the use of resources is maintained for the sidelink communication, the first UE may employ one or more of the techniques described herein for interference reduction.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication including receiving, by a first wireless communication device from a second wireless communication device, a first forward data transmission request signal over a first link in a first link direction, wherein the first forward data transmission request signal is associated with a first feedback transmission over the first link in a second link direction opposite the first link direction; and yielding, by the first wireless communication device in response to the first forward data transmission request signal, access to a channel resource for the first feedback transmission based on at least an interference tolerance level of the second wireless communication device and an interference level on the first feedback transmission from the first wireless communication device.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a first wireless communication device from a second wireless communication device;
a first preemption indication for reallocating a resource allocated for sidelink communication between the first wireless communication device and a third wireless communication device; and
a second preemption indication for reallocating the resource for non-sidelink communication between the first wireless communication device and the second wireless communication device;
determining a priority of the resource; and
preventing use of the resource for the sidelink communication based on the priority of the resource and at least one of the first preemption indication or the second preemption indication.

2. The method of claim 1, further comprising:
identifying a logical channel configured for the sidelink communication; and
determining the priority of the resource based on a priority associated with the logical channel.

3. The method of claim 1, further comprising:
receiving downlink control information (DCI) including an indication of the priority for the resource.

4. The method of claim 1, further comprising:
determining the priority of the resource based on a priority in a resource pool configuration associated with the resource.

5. The method of claim 1, wherein:
the first wireless communication device comprises a first user equipment device;
the second wireless communication device comprises a base station; and
the third wireless communication device comprises a second user equipment device.

6. The method of claim 1, wherein:
the first wireless communication device comprises a first user equipment device;
the second wireless communication device comprises a second user equipment device; and
the third wireless communication device comprises a third user equipment device.

7. The method of claim 1, further comprising:
receiving, by the first wireless communication device from the second wireless communication device via a physical downlink control channel (PDCCH), downlink control information (DCI) including at least one of the first preemption indication or the second preemption indication.

8. The method of claim 1, wherein the preventing the use of the resource for the sidelink communication is further based on a comparison between the priority and a threshold.

9. The method of claim 1, further comprising:
preventing, based on the first preemption indication, use of the resource for communication between the first wireless communication device and the second wireless communication device; and
wherein the preventing the use of the resource for the sidelink communication comprises preventing the use of the resource for the sidelink communication based on the second preemption indication.

10. The method of claim 9, comprising:
receiving, by the first wireless communication device from the second wireless communication device via a physical downlink control channel (PDCCH), first downlink control information (DCI) including the first preemption indication; and
receiving, by the first wireless communication device from the second wireless communication device via the PDCCH, second DCI including the second preemption indication.

11. The method of claim 9, wherein:
a first portion of a bit comprises the first preemption indication; and
a different second portion of the bit sequence comprises the second preemption indication.

12. The method of claim 1, wherein at least one of the first preemption indication or the second preemption indication is associated with an uplink communication or a downlink communication.

13. A method of wireless communication, comprising:
receiving, by a first wireless communication device from a second wireless communication device;
a first preemption indication for reallocating a resource allocated for non-sidelink communication between the first wireless communication device and the second wireless communication device and for sidelink communication between the first wireless communication device and a third wireless communication device; and
a second preemption indication for reallocating the resource for non-sidelink communication between the first wireless communication device and the second wireless communication device;
preventing, based on at least one of the first preemption indication or the second preemption indication, use of the resource for the non-sidelink communication between the first wireless communication device and the second wireless communication device; and
maintaining, based on at least one of the first preemption indication or the second preemption indication, use of the resource for the sidelink communication between the first wireless communication device and the third wireless communication device.

14. The method of claim 13, wherein the maintaining the use of the resource for the sidelink communication comprises:
maintaining, by the first wireless communication device, the use of the resource for the sidelink communication further based on a resource allocation mode associated with the sidelink communication.

15. The method of claim 13, wherein the maintaining the use of the resource for the sidelink communication comprises:
maintaining, by the first wireless communication device, the use of the resource for the sidelink communication further based on a frequency band to be used for the sidelink communication.

16. The method of claim 13, wherein the maintaining the use of the resource for the sidelink communication comprises:
maintaining, by the first wireless communication device, the use of the resource for the sidelink communication further based on a transmission mode associated with the sidelink communication.

17. The method of claim 13, wherein:
the preventing the use of the resource for the non-sidelink communication between the first wireless communication device and the second wireless communication device comprises preventing, by the first wireless communication device, use of a first set of slots in the resource for the non-sidelink communication between the first wireless communication device and the second wireless communication device; and
the maintaining the use of the resource for the sidelink communication comprises maintaining, by the first wireless communication device, use of a different second set of slots in the resource for the sidelink communication.

18. The method of claim 13, further comprising:
receiving, by the first wireless communication device from the second wireless communication device, power boosting information comprising an open-loop parameter or a transmission power command (TPC).

19. The method of claim 18, comprising:
receiving, by the first wireless communication device from the second wireless communication device via a physical uplink shared channel (PUSCH), a dynamic grant including the power boosting information.

20. The method of claim 13, wherein:
the first wireless communication device comprises a first user equipment device;
the second wireless communication device comprises a base station; and
the third wireless communication device comprises a second user equipment device.

21. The method of claim 13, wherein:
the first wireless communication device comprises a first user equipment device;
the second wireless communication device comprises a second user equipment device; and
the third wireless communication device comprises a third user equipment device.

22. A user equipment, comprising:
a memory;
a transceiver; and
at least one processor coupled to the memory and the transceiver, wherein the user equipment is configured to:
receive, from a wireless communication device, a first preemption indication for reallocating a resource allocated for sidelink communication between the user equipment and an additional user equipment;
receive, from the wireless communication device, a second preemption indication for reallocating the resource for non-sidelink communication between the user equipment and the wireless communication device;
determine a priority of the resource; and
prevent use of the resource for the sidelink communication based on the priority of the resource and at least one of the first preemption indication or the second preemption indication.

23. The user equipment of claim 22, wherein the user equipment is further configured to:
identify a logical channel configured for the sidelink communication; and
determine the priority of the resource based on a priority associated with the logical channel.

24. The user equipment of claim 22, wherein the user equipment is further configured to:
receive downlink control information (DCI) including an indication of the priority for the resource.

25. The user equipment of claim 22, wherein the user equipment is further configured to:
determine the priority of the resource based on a priority in a resource pool configuration associated with the resource.

26. The user equipment of claim 22, wherein the wireless communication device comprises a base station.

27. A user equipment, comprising:
a memory;
a transceiver; and
at least one processor coupled to the memory and the transceiver, wherein the user equipment is configured to:
receive, from a wireless communication device, a first preemption indication for reallocating a resource allocated for non-sidelink communication between the user equipment and the wireless communication device and for sidelink communication between the user equipment and an additional user equipment;
receive, from the wireless communication device, a second preemption indication for reallocating the resource for non-sidelink communication between the first wireless communication device and the second wireless communication device;
prevent, based on at least one of the first preemption indication or the second preemption indication, use of the resource for the non-sidelink communication between the user equipment and the wireless communication device; and
maintain, based on at least one of the first preemption indication or the second preemption indication, use of the resource for the sidelink communication between the user equipment and the additional user equipment.

28. The user equipment of claim 27, wherein the user equipment is further configured to:
maintain the use of the resource for the sidelink communication further based on a resource allocation mode associated with the sidelink communication.

29. The user equipment of claim 27, wherein the user equipment is further configured to:
maintain the use of the resource for the sidelink communication further based on a frequency band to be used for the sidelink communication.

30. The user equipment of claim 27, wherein the user equipment is further configured to:
maintain the use of the resource for the sidelink communication further based on a transmission mode associated with the sidelink communication.

* * * * *